US010189018B2

(12) United States Patent
Kozlenko et al.

(10) Patent No.: US 10,189,018 B2
(45) Date of Patent: Jan. 29, 2019

(54) METHOD AND APPARATUS FOR DISPENSING PRECISE ALIQUOTS OF LIQUID

(71) Applicant: VistaLab Technologies, Inc., Brewster, NY (US)

(72) Inventors: Yevgeniy Kozlenko, New Fairfield, CT (US); Richard E. Scordato, Pound Ridge, NY (US)

(73) Assignee: VISTALAB TECHNOLOGIES, INC., Brewster, NY (US)

( * ) Notice: Subject to any disclaimer, the term of this patent is extended or adjusted under 35 U.S.C. 154(b) by 0 days.

(21) Appl. No.: 15/879,003

(22) Filed: Jan. 24, 2018

(65) Prior Publication Data

US 2018/0345271 A1 Dec. 6, 2018

Related U.S. Application Data

(60) Provisional application No. 62/513,030, filed on May 31, 2017.

(51) Int. Cl.
*B01L 3/02* (2006.01)
*G01N 1/14* (2006.01)

(52) U.S. Cl.
CPC ..... *B01L 3/0213* (2013.01); *B01L 2200/0605* (2013.01); *B01L 2200/143* (2013.01); *B01L 2200/146* (2013.01); *B01L 2300/0609* (2013.01); *B01L 2400/049* (2013.01); *B01L 2400/0622* (2013.01)

(58) Field of Classification Search
CPC ............. B01L 3/0213; B01L 2200/146; B01L 2400/049
USPC ........................................................ 73/864.15
See application file for complete search history.

(56) References Cited

U.S. PATENT DOCUMENTS 4,406,170 A 9/1983 Kuhn
4,821,586 A 4/1989 Scordato et al.
7,396,512 B2 * 7/2008 DiTrolio et al. ........ B01L 3/021 422/522
2004/0014238 A1 * 1/2004 Krug et al. .......... B01J 19/0046 436/180

(Continued)

FOREIGN PATENT DOCUMENTS

EP 1512975 A2 * 3/2005 ............ B01L 3/0268

OTHER PUBLICATIONS

International Search Report and Written Opinion issued in International Application No. PCT/US18/35460 dated Jul. 6, 2018, 15 pages.

*Primary Examiner* — Lisa Caputo
*Assistant Examiner* — Roger Hernandez-Prewit
(74) *Attorney, Agent, or Firm* — Venable LLP; Michele V. Frank

(57) ABSTRACT

A pipette controller for aspirating and dispensing multiple aliquots of a fluid from a reservoir of fluid. The pipette controller may include a pipette holder adapted to operatively connect a pipette to the pipette controller; a pressure tank pneumatically connected to the pipette holder; a pump pneumatically connected to the pressure tank and configured to inject air into the pressure tank to create positive air pressure inside the pressure tank; an aliquot valve controlling airflow between the pressure tank and the pipette holder; and an electronic control. The electronic control may open and close the aliquot valve.

24 Claims, 10 Drawing Sheets

(56) References Cited

U.S. PATENT DOCUMENTS

2009/0000350 A1* 1/2009 Magnussen et al. ........................ B01L 3/0217 73/1.74

* cited by examiner

| Capacity of Serological Pipette (ml) | Mean Delivery (1 ml setting) | Coefficient of Variation |
|---|---|---|
| 50 | 1.014 | 0.99% |
| 25 | 1.014 | 0.69% |
| 10 | 0.999 | 0.60% |
| 5 | 0.996 | 1.10% |
| 2 | 0.996 | 1.71% |

| Orientation | No Compensation | Compensation |
|---|---|---|
| 0 | 0.00% | 0.00% |
| 30 | 0.20% | 0.13% |
| 45 | 0.93% | 0.20% |
| 60 | 1.32% | 0.20% |

METHOD AND APPARATUS FOR DISPENSING PRECISE ALIQUOTS OF LIQUID

CROSS-REFERENCE TO RELATED APPLICATIONS

This application claims priority to U.S. Provisional Application No. 62/513,030, filed May 31, 2017, which is hereby incorporated by reference in its entirety.

BACKGROUND OF THE INVENTION

Field of Invention

This patent application relates generally to a method and apparatus for precisely dispensing multiple aliquots of a fluid from a reservoir of fluid or precisely aspirating aliquots of fluid into said reservoir. The fluid in the reservoir may alternatively be manually aspirated and dispensed by the apparatus. The volume of the aliquot can readily be varied. This invention has particular application in laboratory practice for aspirating a quantity of fluid into a serological pipette and then dispensing precise aliquots of the fluid.

Background

Serological pipettes are widely used for liquid measurement and dispensing in laboratories that perform, for example, drug development, environmental testing, and diagnostic testing. These pipettes may be described as glass or plastic straws, and may be, for example, approximately 30 cm long with graduations printed on them. Traditionally, liquid was drawn into these pipettes by applying suction to the top end by mouth or a rubber bulb. Liquid is measured by aspirating to a graduation line, and then dispensed by removing the suction. Current practice often employs a pipette controller such as a Drummond Scientific Pipette-Aid or a BrandTech Scientific acu-j et Pro Pipette Controller which use a small battery powered air pump and trigger-style pneumatic valves to manipulate pressure inside of serological pipettes to draw up and expel liquid.

Frequently, multiple aliquots of a sample must be dispensed for the analytical process. To do this the user first aspirates slightly more than the required volume and then slowly dispenses sample until the meniscus of the fluid aligns with a graduation line on the serological pipette. This is the starting volume. The user must note this reading and then dispense fluid until the meniscus drops to the graduation line corresponding to the difference between the starting volume and the desired dispense volume. If another aliquot is required, the user dispenses again to the graduation line corresponding to the difference between the prior reading and the desired volume. This methodology has many problems. It is time consuming because the meniscus must be carefully read for each dispense. This requires holding the pipette controller very steady while reading the meniscus and simultaneously dispensing into the correct test vessel. This is a time consuming and fatiguing process when it must be repeated many times.

There are also multiple sources of error with the above described method: the meniscus must be read twice to obtain an accurate reading, and the user must subtract the first reading from the second reading. This is easy when a common volume like 1 ml is needed, but difficult for repetitive dispensing of 1.3 ml, for example. There is also an error associated with taking the difference between two larger numbers. For example, one can read a 25 ml serological pipette to an accuracy of 0.25 ml or 1%. However, if one attempts to dispense 25 aliquots of 1 ml this 0.25 ml error translates to a potential error of 0.5 ml since two readings are required. This is an error of 50% which is not acceptable for most analyses.

Previous methods to dispense multiple aliquots of fluid have depended upon methods that are cumbersome and lack flexibility. For example, U.S. Pat. No. 4,406,170 describes a device that can dispense aliquots from a syringe. This device can be quite accurate; however, it requires the use of syringes which are much more expensive than serological pipettes, are much harder to load into the device, do not easily enable the range of volumes, and cannot reach into vessels that require a longer length.

Piston operated, air-displacement pipettes such as one described in U.S. Pat. No. 4,821,586 are capable of dispensing multiple aliquots. However, this method requires a piston displacement that is equal to the volume to be aspirated. Serological pipettes are often used to aspirate 50 ml. This method requires a very large and impractically sized piston to aspirate this large of a volume. In addition, the range of volumes that can be dispensed accurately is limited because of the air contained between the liquid sample and the piston—the "dead volume." As the dead volume increases, the accuracy decreases. This method therefore requires several sizes of pipettes to accurately dispense the normal volumes used in a laboratory.

U.S. Pat. No. 7,396,512 attempts to overcome the above difficulties by controlling the time that air flows into a serological pipette to control the volume dispensed. Pressures on both sides of the valve are monitored. This design has several fundamental shortcomings. One shortcoming is that the volume dispensed will be decreased if the back pressure from the serological pipette is increased by, for example, the tip of the serological pipette being partially occluded by a vessel wall or if the tip is immersed in fluid. The flow is also dependent upon the viscosity of the liquid dispensed. Another difficulty is that the delivered volume is dependent upon the size of serological pipette attached to the device. This means that the user must inform the device of the size pipette being used. In most labs, serological pipettes are disposable and changed constantly, oftentimes with a different volume capacity. This device requires the user to enter the volume and the manufacturer of the serological pipette to obtain accurate results. This is time consuming and an impractical burden on the user.

Therefore, what is required is a pipette controller that can aspirate fluid into a serological pipette and then quickly and accurately dispense a series of aliquots by simply depressing a button. In addition, the volume of the aliquot can be easily set, and the volume dispensed is not dependent upon the size of serological pipette that is mounted to the pipette controller, the viscosity of the sample, or how the sample is dispensed.

SUMMARY

According to an embodiment, a pipette controller is disclosed comprising a pipette holder adapted to operatively connect a pipette to the pipette controller; a pressure tank pneumatically connected to the pipette holder; a pump pneumatically connected to the pressure tank and configured to inject air into the pressure tank to create positive air pressure inside the pressure tank; an aliquot valve controlling airflow between the pressure tank and the pipette holder; and an electronic control; wherein the electronic control opens and closes the aliquot valve.

According to another embodiment, a pipette controller is disclosed comprising a pipette holder adapted to operatively connect a pipette to the pipette controller; a vacuum tank pneumatically connected to the pipette holder; a vacuum tank pressure sensor that measures the air pressure inside the vacuum tank; a pump pneumatically connected to the vacuum tank and configured to evacuate air from the vacuum tank to create a negative air pressure inside the vacuum tank; an aliquot valve controlling airflow between the vacuum tank and the pipette holder; an aliquot volume control operable to select the aliquot volume; and an electronic control; wherein the electronic control opens and closes the aliquot valve.

According to another embodiment, a method for delivering fluid from a pipette using a pipette controller is disclosed comprising selecting an aliquot volume to be dispensed; determining air pressure inside a pressure tank operatively connected to the pipette, and atmospheric air pressure; injecting air into the pressure tank using a pump, to a pre-determined positive air pressure within the pressure tank; placing the pipette into the fluid; aspirating the fluid into the pipette; determining the amount of air to insert into the pipette to dispense a volume of fluid equal to the selected aliquot volume; calculating the decrease in air pressure inside the pressure tank when the amount of air to insert into the pipette to dispense a volume of fluid equal to the aliquot volume is removed from the pressure tank; opening an aliquot valve to allow airflow from the pressure tank to the pipette, the airflow dispensing the fluid from the pipette; determining the change in air pressure inside the pressure tank; and closing the aliquot valve when the decrease in air pressure inside the tank equals the calculated decrease in air pressure.

According to another embodiment, a pipette holder adapted to operatively connect a pipette to the pipette controller; a pressure tank pneumatically connected to the pipette holder; a pressure tank pressure sensor that measures the air pressure inside the pressure tank; a pump pneumatically connected to the pressure tank and configured to inject air into the pressure tank to maintain a positive air pressure inside the pressure tank; a vacuum tank pneumatically connected to the pipette holder; a vacuum tank pressure sensor that measure the air pressure inside the vacuum tank; a pump pneumatically connected to the vacuum tank and configured to evacuate air from the vacuum tank to maintain a negative pressure inside the vacuum tank; an aspiration valve that controls airflow from the pipette holder to the vacuum tank; a dispense valve that controls airflow from the pressure tank to the pipette holder; a pressure sensor that measures pressure in the pipette holder, such pressure being substantially the same as the pressure in the pipette; an electronic controller that interfaces with the pressure sensors and can control at least the aspirate valve, dispense valve, and pump; a user interface in communication with the electronic controller to communicate a volume to be aspirated or dispensed.

A method and apparatus are disclosed that may aspirate fluid into a vessel such as a serological pipette and dispense a series of equal volume aliquots. According to embodiments, the apparatus includes a vacuum tank and a pressure tank which are pressurized and evacuated, respectively, by an air pump. The pressures in the pressure tank and vacuum tank are measured by pressure sensors and controlled to a known value by a microprocessor.

According to embodiments, the apparatus is a hand-held device configured like a pistol which employs a rubber seal to mount a serological pipette. According to an embodiment, controls for manual aspiration, manual dispense, aliquot dispense and aliquot volume are provided. Pressure transducers measure pressures in the pressure tank, vacuum tank, serological pipette and atmosphere. A formula is disclosed that calculates the amount of air that needs to be injected into the serological pipette to dispense a desired aliquot volume, and further calculates the pressure drop in the pressure tank that will occur when this volume of air is released from the pressure tank. The microprocessor may open a valve that introduces air from the pressure tank into the serological pipette, and close the valve when the pressure in the pressure tank drops by the calculated amount.

According to an embodiment, the quantity of air injected into the serological pipette is based on the measured pressures in the serological pipette, pressure tank and atmosphere before each dispense. This enables precise aliquots of fluid to be dispensed and such aliquots are substantially independent of the total volume of fluid in the serological pipette, viscosity of the fluid and volume capacity of the serological pipette. According to embodiments, a sensor may detect the orientation of the apparatus and apply a correction factor to the air volume injected depending upon this orientation. According to embodiments, the apparatus may have manual aspiration and dispense controls which may apply vacuum or pressure, respectively, to the serological pipette through valves. Since the vacuum and pressure are controlled by the microprocessor, fine control of the manual aspiration and dispense is obtained.

BRIEF DESCRIPTION OF THE SEVERAL VIEWS OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. A person skilled in the relevant art will recognize that other components and configurations can be used without departing from the spirit and scope of the invention.

Although the term "pipette" and "pipette controller" may be used to describe embodiments of the invention, a person skilled in the relevant art will recognize that other devices that aspirate fluids may be used without departing from the spirit and scope of the invention.

Figure 1A:
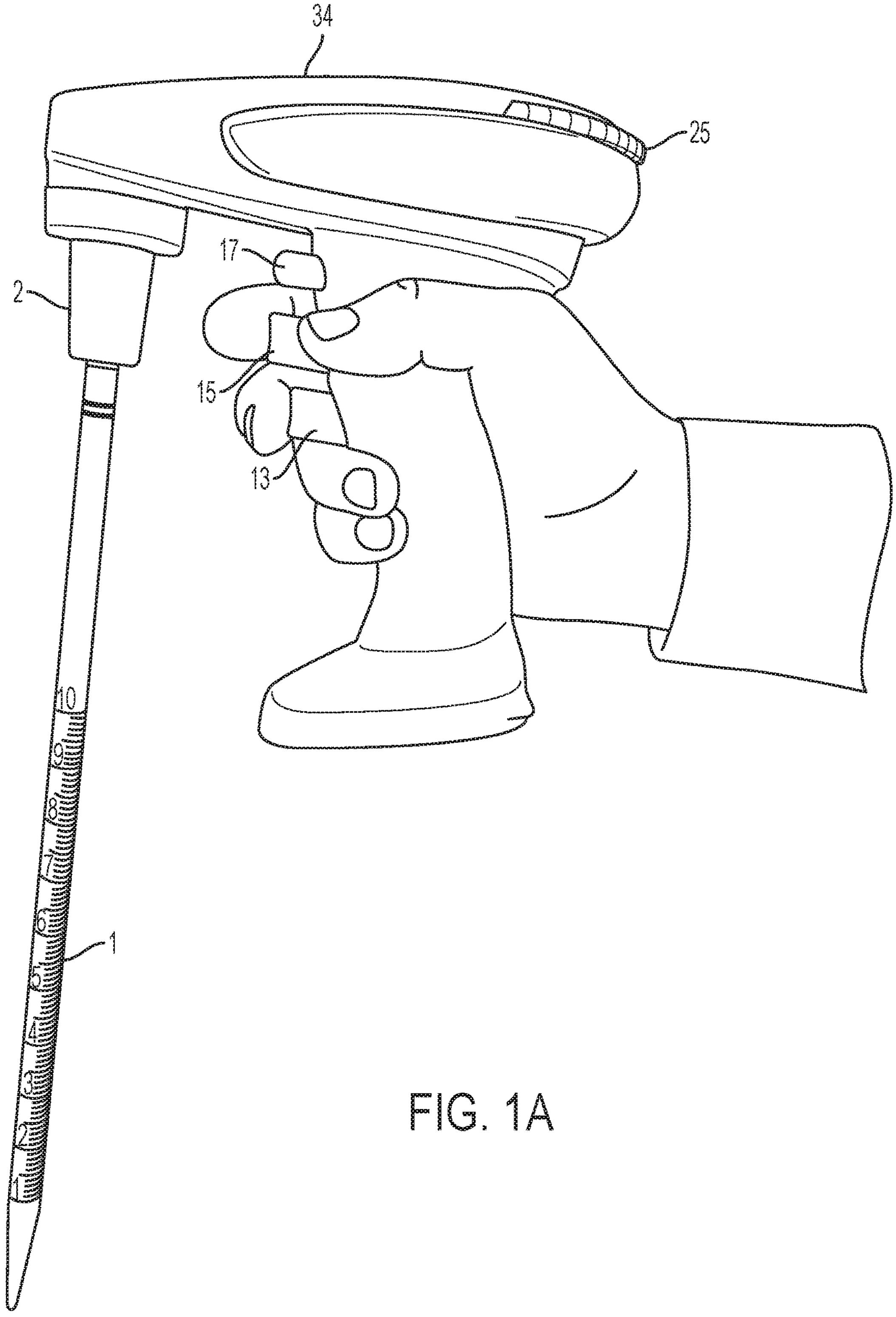
FIG. 1A is a side perspective view of an embodiment of a pipette controller.
Figure 1B:
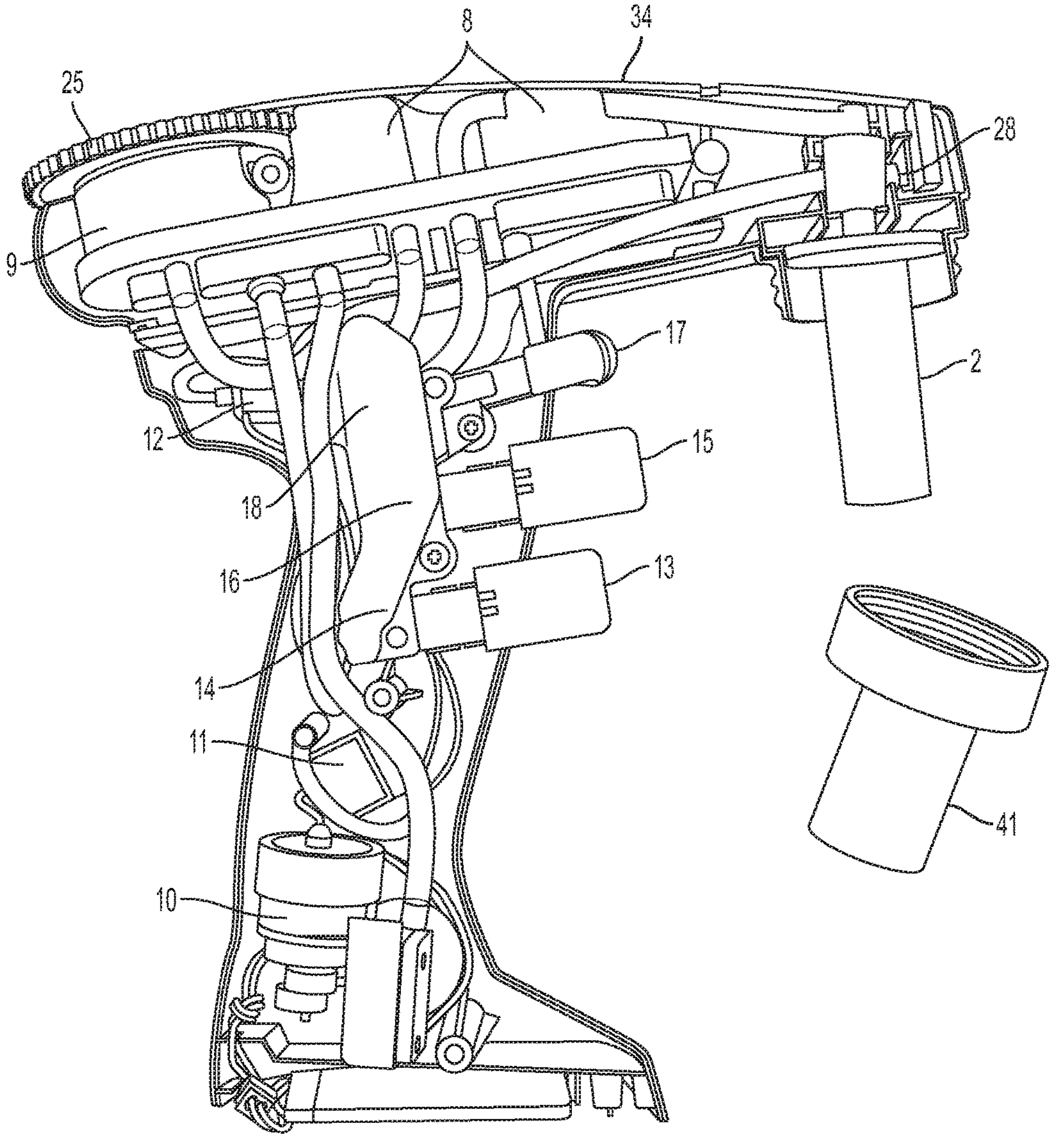
FIG. 1B is a cutaway view of an embodiment of a pipette controller.

FIGS. 1A and 1B illustrate an embodiment of a pipette controller 34. Pipette controller 34 may aspirate fluid into serological pipette 1 (FIG. 1) by depressing aspirate actuator button 15. According to embodiments, the degree of opening of valve 16 may be controlled by the degree of pressure applied to aspirate actuator button 15. According to embodiments, fluid may be dispensed from serological pipette 1 by depressing dispense actuator button 13. For example, partial depression of aspirate actuator button 15 may result in a reduced speed of aspiration compared to full depression of aspirate actuator button 15. According to embodiments, the speed of dispense may be controlled by the degree of pressure on dispense actuator button 13. For example, partial depression of dispense actuator button 13 may result in a reduced speed of dispensing of fluid compared to full depression of dispense actuator button 13. According to embodiments, aliquot actuator button 17 enables dispensing precise aliquots of fluid from serological pipette 1. Each press of aliquot actuator button 17 can dispel an equal volume of fluid from serological pipette 1 that may be set by aliquot volume control 25.

Figure 2A:
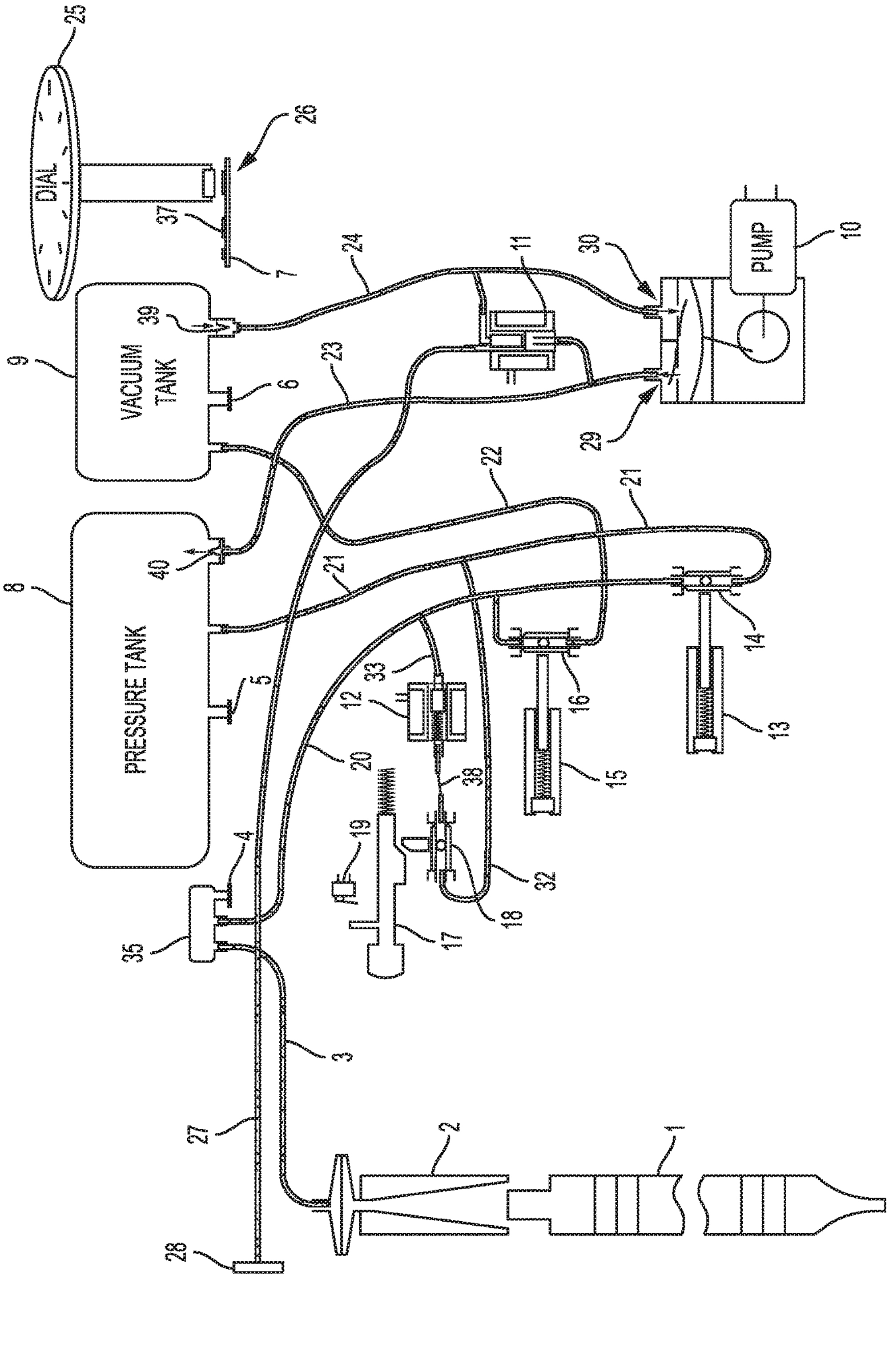
FIG. 2A is a functional diagram of airflow within an embodiment of the pipette controller.
Figure 2B:
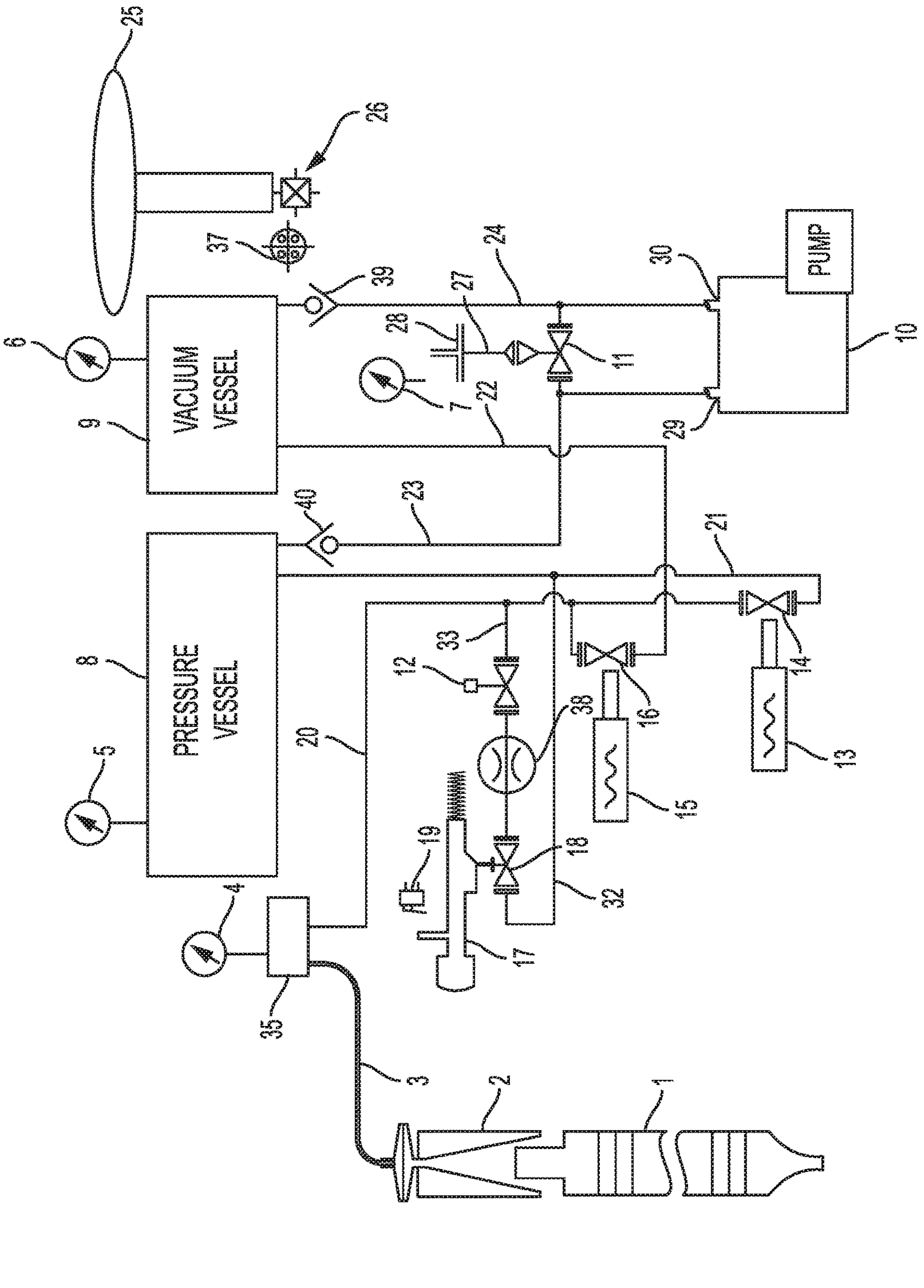
FIG. 2B is a functional diagram of airflow within an embodiment of the pipette controller.
Figure 4:
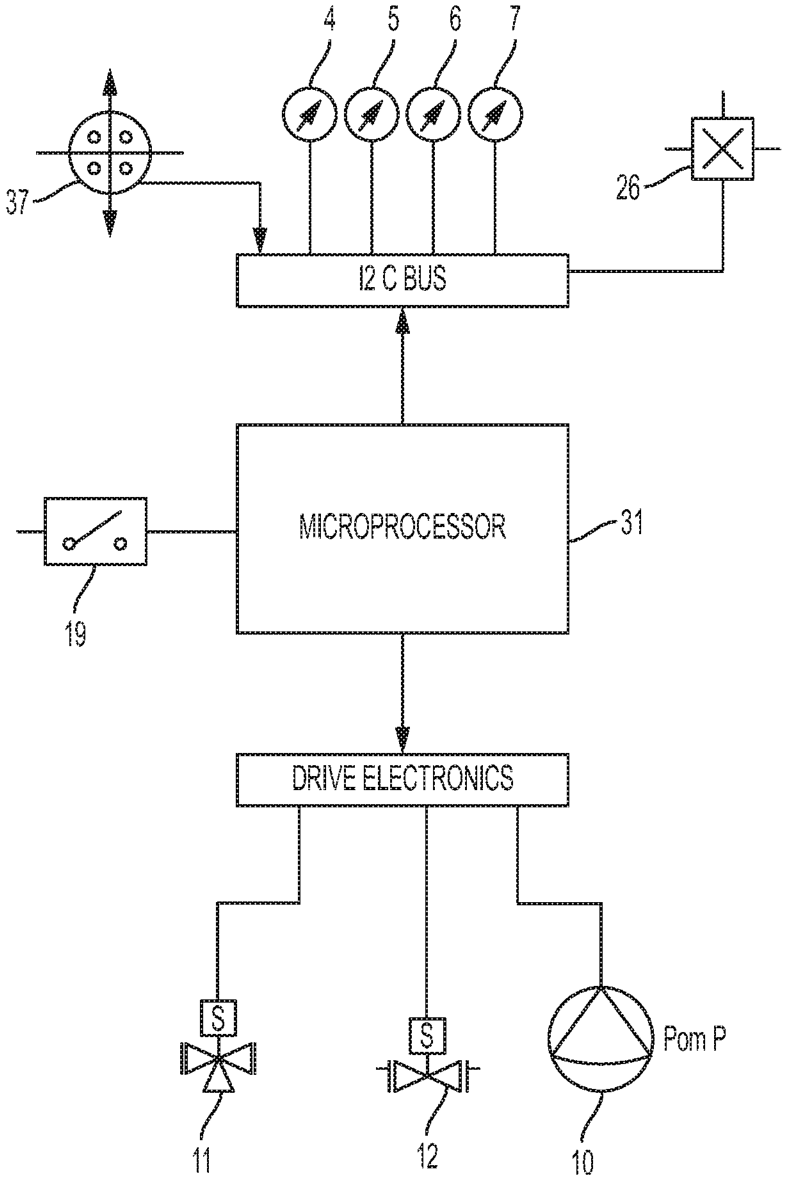
FIG. 4 is a block diagram of electronic control of an embodiment of the pipette controller.

FIGS. 2A and 2B illustrate functional diagrams of the air flow in an embodiment of the apparatus. Serological pipette 1 is removably and pneumatically connected to cone seal 2, which in turn is connected to manifold 35 via air tube 3. According to embodiments, cone seal 2 may include a cover 41. The pressure in the manifold 35 may be essentially the same pressure in the air column in the serological pipette 1 and may be measured by pressure sensor 4. FIGS. 2A and 2B are schematics of the air flow and mechanical components. Note that the electro-mechanical components may have wiring. However, the electrical connections between pressure sensors 4, 5, 6, 7; electrically actuated valves 11, 12; orientation sensor 37; and microprocessor 31 are not shown on this diagram for clarification. FIG. 4 shows how microprocessor 31 of an embodiment of the pipette controller is connected to other components of the pipette controller, shown in FIGS. 2A and 2B. Pressure tank 8 may be pressurized by pump 10 through check valve 40 and air tube 23, which is connected to pump outlet 29 of pump 10. The pressure in pressure tank 8 may be measured by pressure sensor 5. Pump inlet 30 to pump 10 may be attached via air tube 24 and check valve 39 to vacuum tank 9 or to atmosphere through valve 11 air tube 27 and air vent 28. In some embodiments, air tubes may be joined together in a "T" connection or three-way junction. For example, according to an embodiment, where air tube 33 joins air tube 20, three paths may be joined pneumatically. According to an embodiment, the three-way junction may be formed by plastic fittings (shaped like a "T") that have three nipples, each of which is connected to an air tube.

According to an embodiment, pressure in vacuum tank 9 may be measured by pressure sensor 6. Three-way valve 11 connects air vent 28 through air tube 27 to either the pump inlet 30 or pump outlet 29 of pump 10. Three-way valve 11 may be electrically operated and controlled by microprocessor 31. Aspirate actuator button 15 and dispense actuator button 13 control aspirate valve 16 and dispense valve 14, respectively. According to an embodiment, dispense valve 14 and aspirate valve 16 are normally closed and are opened by depressing dispense actuator button 13 and aspirate actuator button 15, respectively. The degree of opening of dispense valve 14 and aspirate valve 16 may be varied with the amount of pressure applied by the user to actuator buttons 13 and 15, respectively. Pressure tank 8 may also be pneumatically connected to manifold 35 via air tubes 21, which are connected to air tube 32, through aliquot enable valve 18, through flow restrictor 38, through aliquot valve 12 and via air tube 33, which is connected to air tube 20.

Pressure tank 8 may be connected to manifold 35 through air tube 20, dispense valve 14 and air tube 21. Vacuum tank 9 may be connected to manifold 35 through air tube 20, aspirate valve 16 and air tube 22.

Atmospheric pressure may be monitored by pressure sensor 7. Sensor 26 may measure the position of aliquot volume control 25 in order to communicate this position to microcomputer 31. Switch 19 may detect when aliquot actuator button is depressed and the switch closing may be sent to microprocessor 31.

According to embodiments, there are two modes of operation of pipette controller 34: manual aspirate/dispense and aliquot dispensing, described below.

Manual Aspirate and Dispense Mode. According to an embodiment, in manual aspirate and dispense mode, fluid may be aspirated and dispensed from serological pipette 1 by placing pressure on aspiration actuator button 15 and dispense actuator button 13, respectively. Pump 10 may be controlled by microprocessor 31, and may be operated such that pressure tank 8 and vacuum tank 9 are set to a known pressure, for example, 3 psi and −3 psi, respectively. FIG. 4 shows microprocessor 31 of an embodiment of the pipette controller is connected to other components of the pipette controller, shown in FIGS. 2A and 2B. According to an embodiment, the known pressure ranges for pressure tank 8 and vacuum tank 9 may be, for example 10 psi and −10 psi. When the pressure tank 8 is being pressurized, three-way valve 11, under microprocessor 31 control, may connect air vent 28 through air tube 27 to pump inlet 30. This allows air from the atmosphere to be pumped by pump 10 into the pressure tank 8. Check valve 39 prevents atmospheric air from entering vacuum tank 9. The microprocessor 31 will stop the pump when the desired pressure is achieved. The microprocessor may also vary the rate of pressurization by modulating the power applied to the pump by means such as pulse width modulation. According to embodiments, the power source may be a battery or USB port. Vacuum tank 9 is evacuated in an analogous way except that three-way valve 11 connects air vent 28 to pump outlet 29 of the pump 10 and this provides the path for air to be evacuated from vacuum tank 9. Check valve 40 prevents pressurized air from leaking from pressure tank 8 in this mode of operation.

According to an embodiment, when aspirate actuator button 15 is depressed, vacuum from vacuum tank 9 is applied through aspirate valve 16 to manifold 35, and from there to the serological pipette 1. If the tip of the serological pipette 1 is immersed in fluid, fluid is thereby sucked into the serological pipette 1. The amount of air through aspirate valve 16 may be regulated by the pressure on aspirate actuator button 15. Since the vacuum applied from vacuum tank 9 is applied at or near the instant that aspirate valve 16 is opened and the pressure is relatively constant, a smooth control over the aspiration rate can be achieved. This is of considerable benefit to the user and is superior to methods used in other pipette controllers. Other pipette controllers have a noticeable delay from the time the aspirate actuator button is depressed until the aspiration of fluid begins because the pump only turns on when the button is pressed, and it takes time to create the vacuum needed to aspirate.

According to an embodiment, to manually dispense fluid from serological pipette 1, the dispense actuator button 13 may be depressed, which connects pressure tank 8 through dispense valve 14 to manifold 35 to serological pipette 1. The constant pressure in pressure tank 8 and operation of dispense valve 14 provide excellent control over the rate of dispensing. The microprocessor 31 continually monitors the pressures in the pressure tank 8 and vacuum tank 9 via pressure sensors 5 and 6 and operates the pump 10 and three-way valve 11 to restore the desired pressure(s) when required. In another embodiment Manual Aspirate and dispense can be accomplished by selectively connecting the inlet or outlet of pump 10 to manifold 35 in order to aspirate or dispense fluid, respectively.

Aliquot Dispense Mode. According to an embodiment, in the aliquot dispense mode, precise aliquots of fluid are dispensed from serological pipette 1 with each push of aliquot actuator button 17. For example, 20 ml of fluid may first be aspirated into the serological pipette 1 by depressing the aspirate actuator button 15 until the required total fluid level is observed in the serological pipette 1. The desired aliquot volume is set using aliquot volume control 25. Then, upon each depression of the aliquot actuator button 17, the desired aliquot volume is dispensed. In this example, if a 1 ml aliquot is desired, 20 aliquots of 1 ml can be dispensed from the serological pipette 1.

To use the aliquot dispense mode, a user may set the desired aliquot volume using aliquot volume control 25. According to an embodiment, aliquot volume control 25 may be a dial that is rotated by the user to align an indicator with a pre-set volume markings. According to embodiments, position sensor 26 may be a Hall Effect sensor, for example, an AMS AS5601. A magnet affixed to aliquot volume control 25 is sensed by position sensor 26. The position sensor 26 reads the angle of aliquot volume control 25 and communicates with microprocessor 31 to relate the aliquot volume desired by the user. Any other type of rotary position sensor, a potentiometer, or any other position sensor may be employed. According to an embodiment, aliquot volume control 25 may include keypads pressed by the user to input the desired aliquot volume. According to an embodiment, aliquot volume control 25 may include an analog or digital display that displays the selected aliquot volume. Serological pipette 1 may be aspirated with a volume greater than the desired aliquot volume by depressing aspiration actuator button 15 until the desired starting volume is aspirated into serological pipette 1. To dispense the aliquot, aliquot actuator button 17 is pressed and an aliquot of fluid with a volume corresponding to the desired aliquot volume set by aliquot volume control 25 is dispensed. Further aliquots may be dispensed by pressing aliquot actuator button 17 until all of the fluid is dispensed from serological pipette 1.

Figure 3A:
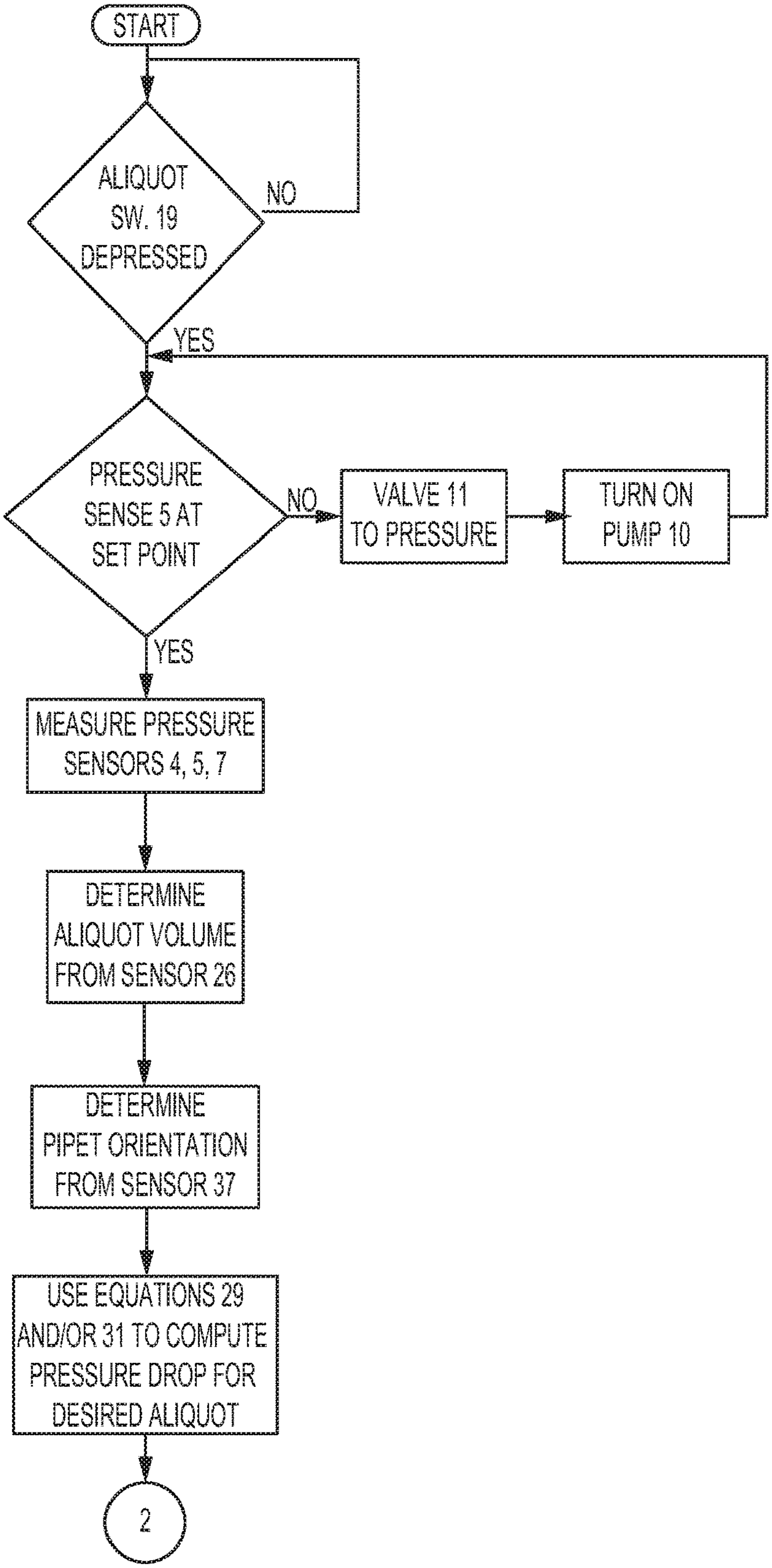
FIGS. 3A and 3B are flow charts of an embodiment of aliquot dispense mode.
Figure 3B:
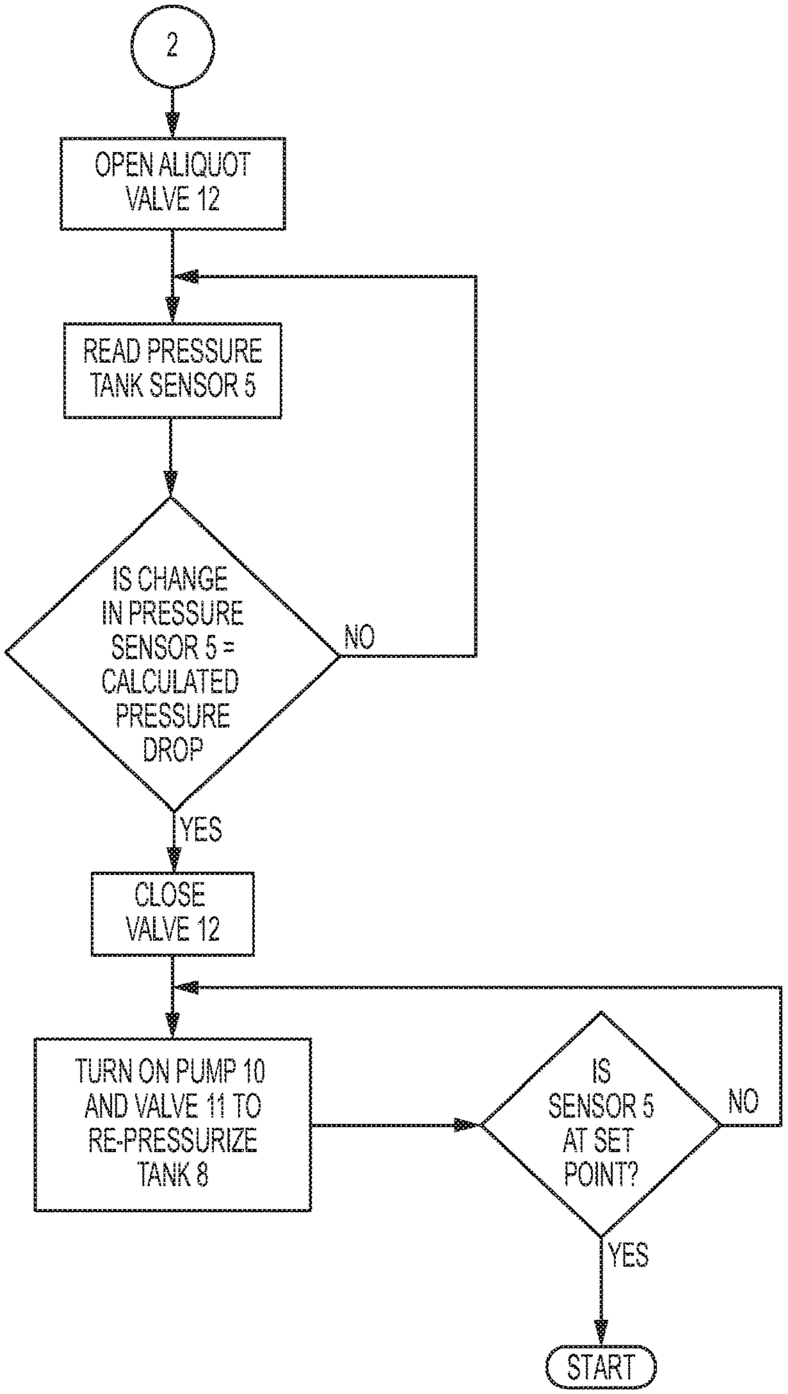

FIGS. 3A and 3B illustrate a flow chart of the aliquot dispense mode, further described below.

According to an embodiment, when aliquot actuator button 17 is depressed, aliquot detect switch 19 is actuated which communicates to the microprocessor 31 that an aliquot is desired. The microprocessor reads the value of position sensor 26 which informs the microprocessor of the volume of fluid that is to be aliquoted, as indicated by volume aliquot volume control 25. The microprocessor 31 reads pressure sensors 4, 5, and 7 which provide the pressures in the manifold 35, pressure tank 8, and the atmosphere, respectively. According to an embodiment, pressure sensor 7 may be optional, and atmospheric pressure may be determined by alternate means such as manual input or obtaining pressure readings through the internet. In an embodiment, all pressures measured are absolute pressures, however relative pressure to atmospheric pressure sensors may also be used. Pressure sensors 4, 5, 6, and 7 may also measure the temperature and provide corrections due to changes in temperature as well as pressure. According to embodiments, microprocessor 31 may determine the pipette orientation using orientation sensor 37. The microprocessor 31 will then open aliquot valve 12 until the pressure in pressure tank 8 drops by the value that corresponds to the desired volume of fluid to be aliquoted. The algorithm that computes this pressure drop is described below. The air that is released from the pressure tank 8 when aliquot valve 12 opens is transmitted through air tube 21, into air tube 32, through aliquot enable valve 18, flow restrictor 38, aliquot valve 12, air tube 33, air tube 20, into manifold 35, and from there through air tube 3 to cone seal 2 and into serological pipette 1. According to an embodiment, aliquot valve 12 is closed when pressure sensor 5 detects that the change in pressure in pressure tank 8 equals the calculated pressure change from equations 29 or 31 described below. Pump 10 may then re-pressurize pressure tank 8. This process may be repeated for each aliquot. Other types of pressure vessels may be substituted for pressure tank 8.

Aliquot enable valve 18 is also actuated by aliquot actuator button 17 when it is depressed. Aliquot enable valve 18 prevents air leaking through aliquot valve 12 into manifold 35 (as valve ages for example) when aliquot valve 12 is closed. Aliquot enable valve 18 may be a solenoid valves or can be can be eliminated if the aliquot valve 12 does not leak. Flow restrictor 38 provides a controlled release of air to the serological pipette. The amount of restriction of flow restrictor 38 provides a controlled release of air to the serological pipette. The amount of restriction of flow restrictor 38 may be varied in order to increase or decrease the aspiration or dispense rates of this device. This may be accomplished, for example, by varying the orifice size of the flow restrictor. According to embodiments, the timing of aliquot valve 12 may be adjusted to close somewhat earlier than the exact time the pressure in pressure tank 8 drops to the desired level in order to compensate for the time it takes the aliquot valve 12 to close.

Description of Block Diagram, FIG. 4. The control system for an embodiment of pipette controller 34 is described. Microprocessor 31, which can be for example an ATmega328p (Microchip Technology, Chandler, Ariz.), controls the sensors, pump and solenoid valves. Pressure sensors 4, 5, 6, and 7 may be, for example, BMP280 (Bosch Sensortec, Reutlingen/Kusterdingen, Germany) or equivalent sensors which measure absolute pressure and temperature and may be interfaced to microprocessor 31 using standard interfaces such as I2C or SPI. An I2C bus reduces the number of electrical connections required. According to embodiments, pipette controller 34 may include an orientation sensor. Orientation sensor 37 may be, for example, a LIS2DHTR (STMicroelectronics, Geneva, Switzerland) or equivalent which provides orientation and acceleration information and may be interfaced to a microprocessor using a standard interface such as I2C or SPI. According to an embodiment, orientation sensor 37 and position sensor 26 may both be connected via the I2C bus. According to an embodiment, pump 10, three-way valve 11, and aliquot valve 12 may be controlled by the microprocessor. According to embodiments, aliquot valve 12 may be a solenoid valve. The speed of the motor and operation of the valves may be controlled by such methods as pulse-width-modulation. According to an embodiment, when aliquot actuator button 17 is depressed, aliquot detect switch 19 is actuated which communicates to the microprocessor 31 that an aliquot is desired.

Derivation of the Volume of Fluid Dispensed when a Bolus of Air is Injected.

Figure 5:
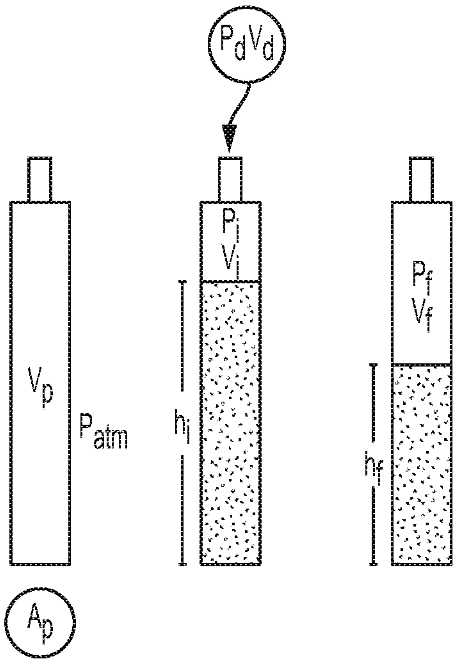
FIG. 5 is a schematic diagram of serological pipette pressures.

Boyle's Law, PV=nRT, teaches that a container of known volume V at a known pressure P and temperature T will hold a known number of air molecules n. If the pressure in this volume is reduced a known amount, then a known number of air molecules will be released. According to embodiments, this principle is used to inject a known number of air molecules into a serological pipette. The relationship between the quantity of air to be injected into the serological pipette and aliquot volume desired is derived as follows:

Refer to FIG. 5 for the definition of the terms used here. $V_p$ refers to the total volume of the pipette. $A_p$ refers to the area of the cross-section of the pipette. $P_i$ refers to the initial pressure. $V_i$ refers to the initial volume. $P_d$ refers to the injected pressure. $V_d$ refers to the injected volume. $P_f$ refers to final pressure. $V_f$ refers to final volume. The term $h_i$, refers to the initial height of the fluid column. The term $h_f$, refers to the final height of the fluid column. $P_{atm}$ refers to atmospheric pressure.

Assume T is constant, injecting n number of air molecules is equivalent to injecting a known volume at a known pressure.

$$P_dV_d=nRT \quad (1)$$

Total volume of the pipette remains constant.

$$V_p=V_i+h_iA_p=V_f+h_fA_p \quad (2)$$

Final amount of air in pipette is equal to initial plus injected. Again assuming that T is constant.

$$P_fV_f=V_i+P_dV_d \quad (3)$$

Pressure in pipette settles out to be atmospheric minus the weight of the water column.

$$P_i=P_{atm}-\rho gh_i \quad (4)$$

$$P_f=P_{atm}-\rho gh_f \quad (5)$$

Solve equation (2) for $V_f$.

$$V_f=V_i+h_iA_p-h_fA_p \quad (6)$$

Substitute $P_f$ and $P_i$ from equations (4) and (5) into equation (3).

$$(P_{atm}-\rho gh_f)V_f=(P_{atm}-\rho gh_i)V_i+P_dV_d \quad (7)$$

Substitute for $V_f$ from equation (6) into equation (7).

$$(P_{atm}-\rho gh_f)(V_i+h_iA_p-h_fA_p)=(P_{atm}-\rho gh_i)V_i+P_dV_d \quad (8)$$

$$P_{atm}V_i+P_{atm}h_iA_p-P_{atm}h_fA_p-\rho gh_fV_i-\rho gh_fh_iA_p+\rho gh_f^2A_p=P_{atm}V_i-\rho gh_iV_i+P_dV_d \quad (9)$$

Multiply through, solve for zero, factor out $h_f$.

$$P_{atm}h_iA_p-P_{atm}h_fA_p-\rho gh_fV_i-\rho gh_fh_iA_p+\rho gh_f^2A_p+\rho gh_iV_i-P_dV_d=0 \quad (10)$$

$$(\rho gA_p)h_f^2-(P_{atm}A_p+\rho gV_i+\rho gh_iA_p)h_f+(\rho gh_iV_i-P_dV_d+P_{atm}h_iA_p)=0 \quad (11)$$

Plug in coefficients from equation (11) into quadratic formula to solve for $h_f$ (the root where the radical is subtracted is the only one that gives a real answer).

$$h_f=\frac{(P_{atm}A_p+\rho gV_i+\rho gh_iA_p)-\sqrt{(P_{atm}A_p+\rho gV_i+\rho gh_iA_p)^2-4(\rho gA_p)(\rho gh_iV_i-P_dV_d+P_{atm}h_iA_p)}}{2(\rho gA_p)} \quad (12)$$

Volume of water dispensed $V_{AQ}$ is equal to change in water column height times pipette cross-sectional area.

$$V_{AQ}=(h_i-h_f)A_p \quad (13)$$

Define $\Delta P_N$ as gauge pressure in nozzle (above the surface of the liquid) before the dispense.

$$\Delta P_N=P_i-P_{atm} \quad (14)$$

Solve equations (4) and (5) for $h_i$ and $h_f$ and substitute in equation (14).

$$h_i=\left(\frac{P_{atm}-P_i}{\rho g}\right)=\frac{-\Delta P_N}{\rho g} \quad (15)$$

$$h_f=\left(\frac{P_{atm}-P_i}{\rho g}\right)-\frac{V_{AQ}}{A_P}=\frac{-\Delta P_N}{\rho g}-\frac{V_{AQ}}{A_P} \quad (16)$$

Solve equation (10) for $P_dV_d$.

$$P_dV_d=P_{atm}h_iA_p-P_{atm}h_fA_p-\rho gh_fV_i-\rho gh_fh_iA_p+\rho gh_f^2A_p+\rho gh_iV_i \quad (17)$$

Substitute equations (15) and (16) into equation (17).

$$P_dV_d=P_{atm}\frac{-\Delta P_N}{\rho g}A_p-P_{atm}\left(\frac{-\Delta P_N}{\rho g}-\frac{V_{AQ}}{A_P}\right)A_p-\rho g\left(\frac{-\Delta P_N}{\rho g}-\frac{V_{AQ}}{A_P}\right)V_i-\rho g\left(\frac{-\Delta P_N}{\rho g}-\frac{V_{AQ}}{A_P}\right)\frac{-\Delta P_N}{\rho g}A_p+\rho g\left(\frac{-\Delta P_N}{\rho g}-\frac{V_{AQ}}{A_P}\right)^2A_p+\rho g\frac{-\Delta P_N}{\rho g}V_i \quad (18)$$

$$P_dV_d=P_{atm}\frac{\Delta P_N}{\rho g}A_p-P_{atm}\frac{\Delta P_N}{\rho g}A_p+P_{atm}\frac{V_{AQ}}{A_P}A_p+\rho g\frac{\Delta P_N}{\rho g}V_i+\rho g\frac{V_{AQ}}{A_P}V_i-\frac{\Delta P_N}{\rho g}\Delta P_NA_p-\frac{V_{AQ}}{A_P}\Delta P_NA_p+\rho g\left(\frac{-\Delta P_N}{\rho g}\right)^2A_p+2\rho g\frac{\Delta P_N}{\rho g}\frac{V_{AQ}}{A_P}A_p+\rho g\left(\frac{V_{AQ}}{A_P}\right)^2A_p-\Delta P_NV_i \quad (19)$$

$$P_dV_d=P_{atm}V_{AQ}+\Delta P_NV_i+\rho g\frac{V_{AQ}}{A_P}V_i-\frac{\Delta P_N^2}{\rho g}A_p-V_{AQ}\Delta P_N+\frac{\Delta P_N^2}{\rho g}A_p+2\Delta P_NV_{AQ}+\rho g\frac{V_{AQ}^2}{A_P}-\Delta P_NV_i \quad (20)$$

Multiply through, and simplify a few times.

$$P_dV_d=P_{atm}V_{AQ}+\rho g\frac{V_{AQ}}{A_P}V_i+\Delta P_NV_{AQ}+\rho g\frac{V_{AQ}^2}{A_P} \quad (21)$$

Solve equation (2) for $V_1$ and substitute in equation (15).

$$V_i=V_p-h_iA_p=V_p+\frac{\Delta P_N}{\rho g}A_p \quad (22)$$

Substitute equation (22) into equation (21).

$$P_d V_d = P_{atm} V_{AQ} + \rho g \frac{V_{AQ}}{A_P}\left(V_p + \frac{\Delta P_N}{\rho g} A_p\right) + \Delta P_N V_{AQ} + \rho g \frac{V_{AQ}^2}{A_P} \quad (23)$$

Multiply through and simplify.

$$P_d V_d = P_{atm} V_{AQ} + \rho g \frac{V_{AQ}}{A_P} V_p + \rho g \frac{V_{AQ}}{A_P} \frac{\Delta P_N}{\rho g} A_P + \Delta P_N V_{AQ} + \rho g \frac{V_{AQ}^2}{A_P} \quad (24)$$

$$P_d V_d = P_{atm} V_{AQ} + \rho g \frac{V_{AQ}}{A_P} V_p + 2\Delta P_N V_{AQ} + \rho g \frac{V_{AQ}^2}{A_P} \quad (25)$$

Factor out desired dispense volume.

$$P_d V_d = V_{AQ}\left(P_{atm} + \rho g \frac{V_p}{A_P} + 2\Delta P_N + \rho g \frac{V_{AQ}}{A_P}\right) \quad (26)$$

Simplify.

$$P_d V_d = V_{AQ}\left(P_{atm} + 2\Delta P_N + \rho g \frac{(V_P + V_{AQ})}{A_P}\right) \quad (27)$$

Solve equation (26) for $P_d$.

$$P_d = \frac{V_{AQ}}{V_d}\left(P_{atm} + 2\Delta P_N + \rho g \frac{(V_P + V_{AQ})}{A_P}\right) \quad (28)$$

When $V_d$ is taken to be the volume of the pressure tank, $P_d$ would be the required drop in the pressure tank pressure to dispense $V_{AQ}$ of liquid given assumptions about the pipettes cross-sectional area ($A_p$) and volume ($V_p$) and going off of the nozzle gauge pressure ($\Delta P_N$), also assuming water density, and generally isothermal conditions, entirely cylindrical pipette. ($V_p$ should include the dead volume inside the controller air path, so replace $V_p$ with $V_p+V_{dv}$.)

$$P_d = \frac{V_{AQ}}{V_d}\left(P_{atm} + 2\Delta P_N + \rho g \frac{(V_p + V_{dv} + V_{AQ})}{A_P}\right) \quad (29)$$

Figure 6:
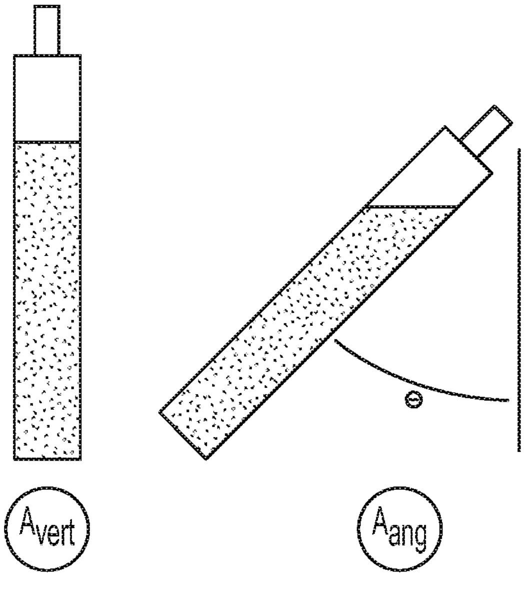
FIG. 6 is a schematic diagram of a serological pipette at an angle.

Correction for the Orientation of the Serological Pipette: Referring to FIG. 6, according to embodiments, the orientation of the serological pipette 1 may be determined using orientation sensor 37. In the event that the pipette is held at an angle Θ instead of vertically, the volume terms in equation (29) will remain the same since volume is independent of orientation, however the $A_p$ term is effected, since the area of the water in the pipette that the air pressure now has an effect on is a larger oval rather than the original circle that is present when the pipette is held vertically.

$$A_{ang} = \frac{A_{vert}}{\cos(\Theta)} \quad (30)$$

One way to solve for the change in the $A_p$ term is to take advantage of the fact that the volume of water is independent of Θ.

$$V_w = A_{vert} h_{WCvert} = A_{ang} h_{WCang} = A_{ang}(h_{WCvert}\cos(\Theta)) \quad (31)$$

The product of the area of the pipette when it is vertical and the height of the water column when it is vertical ($h_{WCvert}$) is equal to the product of the area of the pipette when it is angled and the height of the water column when it is angled ($h_{WCang}$). Given the geometry of the arrangement, the height of the water column when it is angled is cos(θ) times the height of the vertical water column, so solving for the area of the angled pipette results in (30).

Substituting this definition of the area of the pipette that accounts for the angle back into (29) provides:

$$P_d = \frac{V_{AQ}}{V_d}\left(P_{atm} + 2\Delta P_N + \rho g \frac{(V_p + V_{dv} + V_{AQ})}{\frac{A_P}{\cos(\Theta)}}\right) \quad (32)$$

Based on the derivation above, the microprocessor 31 uses this equation to compute the pressure drop $P_d$ required to achieve the desired aliquot volume $V_{AQ}$. Note that the dead volume $V_{dv}$ in the pipette controller is small relative to the serological pipette volume $V_p$, and that the aliquot volume $V_{AQ}$ is also usually small relative to $V_p$. Therefore, the term $(V_p+V_{dv}+V_{AQ})/A_p$ is approximately equal to Vp/Ap. This is the length of the serological pipette, and since most serological pipettes are about the same length, this term is relatively constant and can be ignored to a first order effect. Alternatively, —$V_p$, $V_{dv}$ and $A_p$ could be entered via a keypad or other data entry method.

Results. An embodiment of an apparatus using this method attains excellent repeatability and accuracy in dispensing aliquots. In one test, five different size serological pipettes were attached to the apparatus and 1 ml aliquots were dispensed. The mean delivery with a 2 ml serological pipette (FIG. 7) was within 2% of the delivery with a 50 ml serological pipette. No user adjustment for the size of serological pipette was used to obtain these results. The precision of ten dispenses of 1 ml aliquots ranged from 0.6% to 1.71%.

Figures 7, 8, 9:
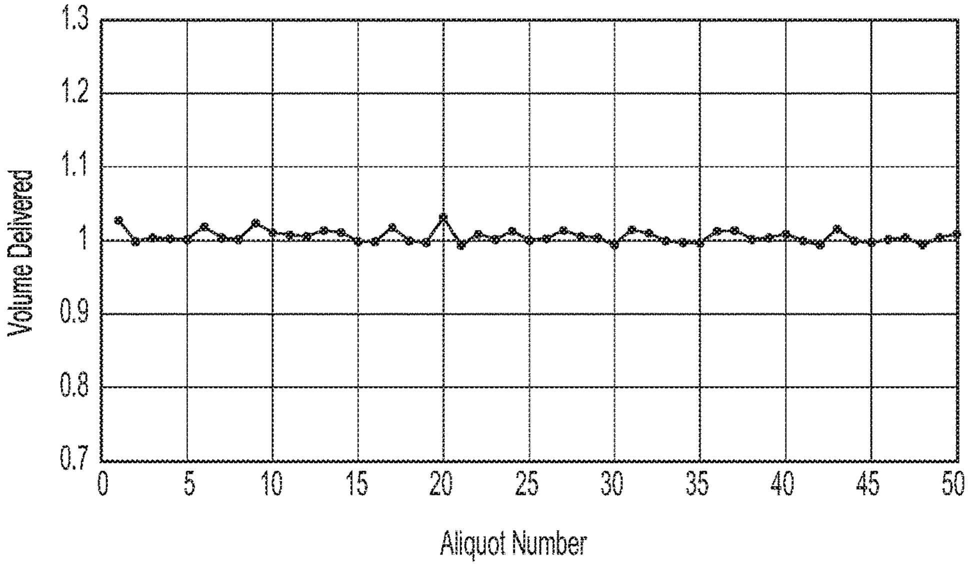
FIG. 7 shows dispense volume results using different size serological pipettes.
FIG. 8 shows repeatability and accuracy results of 25 aliquots of 1 mL.
FIG. 9 shows a comparison of dispense volume results with serological pipettes held at various angles.

In FIG. 8, the results from 25 1 ml dispenses from a 25 ml serological pipette using an embodiment of the invention are shown. The coefficient of variation for these data is 0.84%, which is substantially better than what can be obtained by manually dispensing using a conventional pipette controller.

Pipette users are instructed to hold a pipette vertical in order to obtain accurate results. However, this is not always practical due to the requirement to dispense into vessels such as cell culture flasks which require pipetting at an angle that deviates substantially from vertical. In FIG. 9, the accuracy of 1 ml aliquots using an embodiment of the invention is shown when the serological pipette is held at various angles from vertical. The first column of data shows the angle at which the pipette is held. (“0” degrees is vertical, the normal orientation). The second column shows the accuracy of the dispensed volume when (29) is employed, and the third column shows the improved performance when the compensation of (32) is applied. FIG. 9 shows that, for example, when the apparatus is held at a 60 degree angle an error of 1.32% in the dispense volume is measured. When the compensation of 32 is employed this error reduces to 0.20%.

Figure 10:
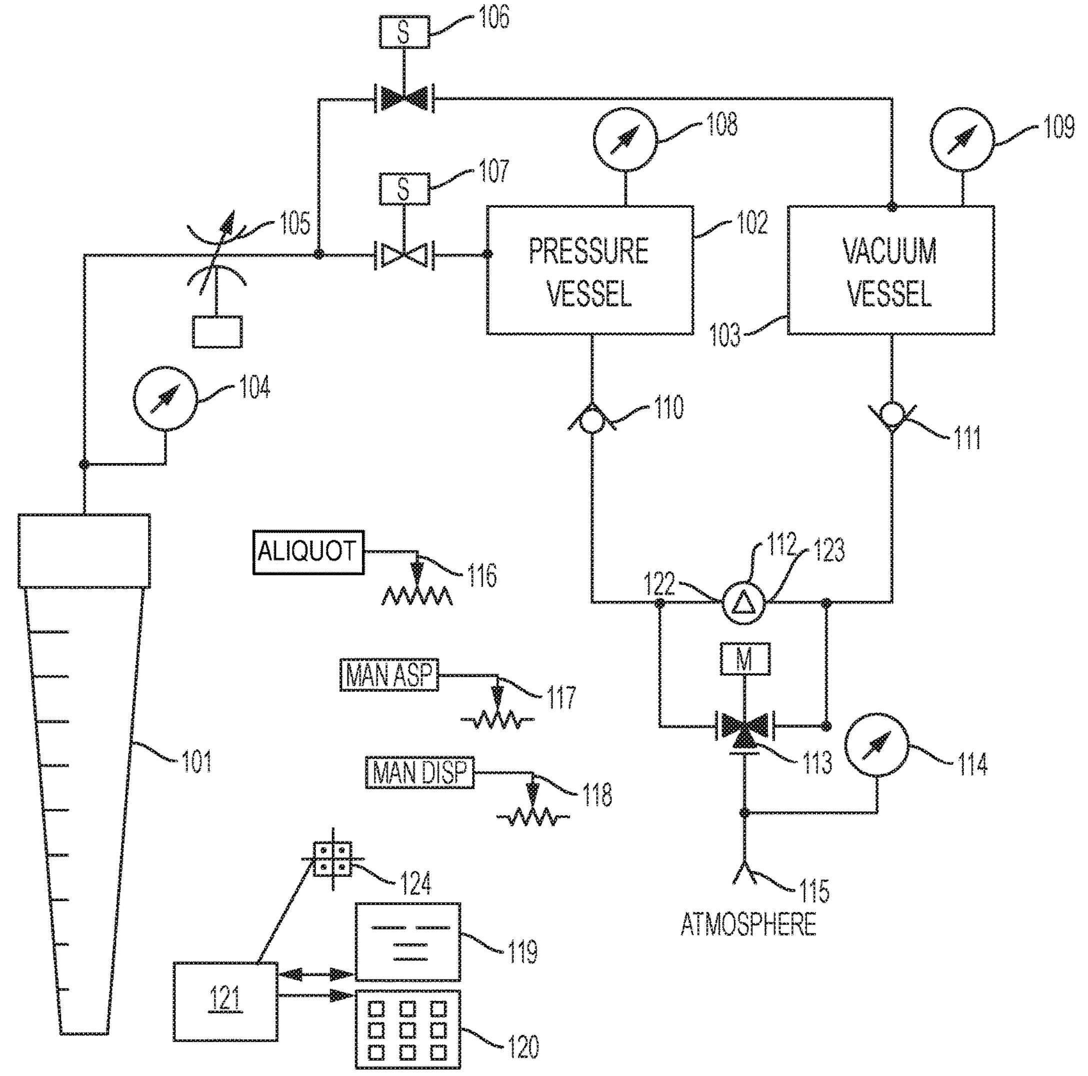
FIG. 10 shows a functional diagram of an alternate embodiment of a pipette controller.

Alternate embodiment. FIG. 10 shows an alternate embodiment of the invention. In this embodiment, pressure vessel 102 and vacuum vessel 103 are pneumatically connected to the serological pipette 101 via variable flow restrictor 105 and solenoid controlled valves 107 and 106 respectively. Pump 112 may pressurize pressure vessel 102 through check valve 110 when valve 113 connects pump inlet 123 of pump 112 to atmosphere. According to embodiments, valve 113 may be a three-way valve. Pump 112 may evacuate vacuum vessel 103 through check valve 111 when three-way valve connects pump outlet 122 to atmosphere via valve 113 and vent 115 which is open to the atmosphere. Check valve 110 prevents pressure vessel 102 from being de-pressurized when the vacuum vessel is evacuated, and check valve 111 prevents vacuum vessel 103 from being pressurized when pressure vessel 102 is being pressurized.

According to an embodiment, pressure sensors 104, 108, 109, 114 measure pressure in the serological pipette 101, pressure vessel 102, vacuum vessel 103, and atmosphere respectively. Aliquot control 116, manual aspiration control 117, and manual dispense control 118 provide an electrical output when actuated and this output may be proportional to the pressure applied. According to an embodiment, this electrical output may be obtained by a variable resistor, digital encoder or other means. This electrical output may be transmitted to microprocessor 121.

According to an embodiment, a display 119 and keypad 120 may be employed to enter the volumes to be aspirated or dispensed, the speed of aspiration, atmospheric pressure or other information. Microprocessor 121 may control the opening and closing of valves 106 and 107; the operation of valve 113 and pump 112; and the measurement of pressure sensors 104, 108, 109, 114. Microprocessor 121 may control the degree of restriction in variable flow restrictor 105.

When an aspirate signal is provided by depressing, for example, manual aspiration control 117, microprocessor 121 opens valve 106 which applies a vacuum from the vacuum vessel 103 through variable flow restrictor 105 to the serological pipette 101. The microprocessor may vary the rate of aspiration by varying the restriction of variable flow restrictor 105, the vacuum in vacuum vessel 103, or both. This flow restriction may be related to the degree of displacement or pressure on manual aspiration control 117. In like fashion, fluid may be dispensed from the serological pipette by applying pressure from pressure vessel 102 by opening valve 107. Flow rate of dispensing may also be varied by control of variable flow restrictor 105, pressure in pressure vessel 102, or both.

A measured amount of fluid may be dispensed from serological pipette 101 in an analogous manner as described above. In this embodiment, the desired volume to be dispensed may be entered via keypad 120. Microprocessor 121 uses equations (29) or (32) to determine the pressure change in pressure vessel 102 that corresponds to the desired volume of fluid to be dispensed. Microprocessor 121 measures pressures in serological pipette 101, pressure vessel 102 and the atmosphere by reading pressure sensors 104, 108, and 114 respectively. Microprocessor 121 then opens valve 107 and measures the change in pressure in pressure vessel 102 by monitoring pressure sensor 108. When the pressure drop measured by pressure sensor 108 reaches the value calculated by equations (29) or (32) that corresponds to the desired dispense volume, microprocessor 121 closes valve 107. The orientation of the serological pipette may be determined by using orientation sensor 124 and computing the pressure change using (32). The initiation of dispense can be initiated by aliquot control 116 or any other control such as manual dispense control 118 or keypad 120. The fluid dispense may be a single dispense or multiple aliquots. The rate of dispense may be controlled by varying the degree of restriction in variable flow restrictor 105, the pressure in pressure vessel 102, or both.

A measured amount of fluid may be aspirated in this embodiment by using an analogous method using vacuum vessel 103. In this instance the pressure change in vacuum vessel 103 that corresponds to the desired aspiration volume is calculated using equations (29) or (32). Microprocessor 121 measures the pressures in the serological pipette 101, vacuum vessel 103, and the atmosphere by using pressure sensors 104, 109, and 114 respectively, and then opens valve 106. Microprocessor 121 monitors pressure sensor 109 and closes valve 106 when the pressure change in vacuum vessel 103 equals the value computed using equations (29) or (32). The orientation of the serological pipette 101 may be determined by reading orientation sensor 124 and computing the pressure change using equation (32). The rate of aspiration may be controlled by varying the degree of restriction in variable flow restrictor 105, the pressure in vacuum vessel 103, or both.

Mixing is a commonly used procedure in laboratories and is often performed by alternately aspirating and dispensing fluid using a standard pipette controller. The degree of mixing is affected by the volume and speed of fluid aspiration and dispense. This is difficult to control exactly when done manually and is fatiguing when done many times per day. In the embodiment of FIG. 10, valves 106 and 107 may be alternately opened and closed to aspirate and then dispense fluid in order to mix. The volume of fluid aspirated and dispensed can be accurately controlled by using the methods described above, and the rate of fluid aspiration and dispense can be controlled by varying variable flow restrictor 105 and/or the pressures in pressure vessel 102 and vacuum vessel 103. A sample can therefore be mixed in a highly controlled and repeatable manner. The mixing function may be initiated by aliquot control 116, keypad 120 or similar means, and the degree of mixing can be programmed into microprocessor 121. Multiple mixing protocols can be stored in microprocessor 121 for easy retrieval.

Additional Embodiments. A person skilled in the relevant art will recognize that the scope of the invention is not limited to pipette controllers, and that the components and configurations may be used in additional applications without departing from the spirit and scope of the invention. According to an embodiment, the components and configurations may be used in, for example, a bottle top dispenser. In other embodiments, the configurations and methods may be used in robotic pipetting systems. Previous robotic pipetting systems were limited by their requirement to change pipette capacity and/or the size of pipette tip to aspirate and dispense a range of volumes greater than 5:1. However, an embodiment of an apparatus using the components and methods described herein would attain excellent repeatability and accuracy in dispensing aliquots without needing to adjust for the size of the pipette over approximately a 100:1 range of volumes. According to an embodiment, the components and methods described herein may be used for remote controlled volume adjustment and aliquotting. A person skilled in the art will further recognize that the components and configurations disclose herein may be used in other applications that require quick, accurate, and/or repeat dispensing of fluids.

While various embodiments of the present invention have been described above, it should be understood that they have been presented by way of example only, and not limitation. Thus, the breadth and scope of the present invention should not be limited by any of the above-described embodiments, but should instead be defined only in accordance with the following claims and their equivalents.

What is claimed:

1. A pipette controller comprising:
a pipette holder adapted to operatively connect a pipette to the pipette controller;
a pressure tank pneumatically connected to the pipette holder;
a pump pneumatically connected to the pressure tank and configured to inject air into the pressure tank to create positive air pressure inside the pressure tank;
an aliquot valve controlling airflow between the pressure tank and the pipette holder;
an electronic control; and
a pressure tank pressure sensor that measures air pressure inside the pressure tank;
wherein the electronic control opens and closes the aliquot valve; and
wherein the electronic control opens the aliquot valve to begin dispensing an aliquot of fluid, and closes the aliquot valve when the air pressure measured by the pressure tank pressure sensor changes to a predetermined air pressure corresponding to an amount of air transferred from the pressure tank to the pipette holder to dispense a volume of fluid equal to an aliquot volume.

2. The pipette controller of claim 1, further comprising:
an aliquot volume control operable to select the aliquot volume.

3. The pipette controller of claim 1, further comprising:
a pipette pressure sensor that determines air pressure inside the pipette holder.

4. The pipette controller of claim 1, further comprising:
an atmospheric pressure sensor to measure atmospheric pressure.

5. The pipette controller of claim 1, further comprising:
a flow restrictor,
wherein the flow restrictor variably modifies the air flow between the pressure tank and the pipette holder.

6. The pipette controller of claim 1, further comprising:
an orientation sensor that measures an angle of a pipette connected to the pipette holder relative to vertical;
wherein the pipette controller corrects the amount of air transferred from the pressure tank to the pipette holder to dispense the volume of fluid equal to the aliquot volume based on the angle of the pipette.

7. The pipette controller of claim 1, further comprising:
a vacuum tank pneumatically connected to the pipette holder;
a vacuum tank pressure sensor that measures air pressure inside the vacuum tank;
an aspirate valve controlling airflow between the pipette holder and the vacuum tank; and
an aspiration control;
wherein the pump is pneumatically connected to the vacuum tank and configured to evacuate air from the vacuum tank to create negative air pressure inside the vacuum tank, and
wherein the aspirate valve opens upon engaging the aspiration control, and the aspirate valve closes upon disengaging the aspiration control.

8. A pipette controller comprising:
a pipette holder adapted to operatively connect a pipette to the pipette controller;
a vacuum tank pneumatically connected to the pipette holder;
a vacuum tank pressure sensor that measures air pressure inside the vacuum tank;
a pump pneumatically connected to the vacuum tank and configured to evacuate air from the vacuum tank to create a negative air pressure inside the vacuum tank;
an aliquot valve controlling airflow between the vacuum tank and the pipette holder;
an aliquot volume control operable to select an aliquot volume; and
an electronic control;
wherein the electronic control opens and closes the aliquot valve; and
wherein the electronic control opens the aliquot valve to begin fluid aspirations and closes the aliquot valve when the air pressure of the vacuum tank changes to a predetermined air pressure corresponding to the amount of air transferred from the pipette holder to the vacuum tank to aspirate a volume of fluid equal to an aliquot volume.

9. The pipette controller of claim 8, further comprising:
a pipette pressure sensor that determines air pressure inside the pipette holder.

10. The pipette controller of claim 8, further comprising:
an atmospheric pressure sensor to measure atmospheric pressure.

11. The pipette controller of claim 8, further comprising:
a flow restrictor;
wherein the flow restrictor variably modifies the air flow between the pipette holder and the vacuum tank.

12. The pipette controller of claim 8, further comprising:
an orientation sensor that measures an angle of a pipette connected to the pipette holder relative to vertical;
wherein the pipette controller corrects the amount of air transferred from the pressure tank to the pipette holder to dispense the volume of fluid equal to the aliquot volume based on the angle of the pipette.

13. A method for delivering fluid from a pipette using a pipette controller comprising:
selecting an aliquot volume to be dispensed;
determining air pressure inside a pressure tank operatively connected to the pipette, and atmospheric air pressure;
injecting air into the pressure tank using a pump, to a pre-determined positive air pressure within the pressure tank;
placing the pipette into the fluid;
aspirating the fluid into the pipette;
determining the amount of air to insert into the pipette to dispense a volume of fluid equal to the selected aliquot volume;
calculating the decrease in air pressure inside the pressure tank when the amount of air to insert into the pipette to dispense a volume of fluid equal to the aliquot volume is removed from the pressure tank;
opening an aliquot valve to allow airflow from the pressure tank to the pipette, the airflow dispensing the fluid from the pipette;
determining the change in air pressure inside the pressure tank; and
closing the aliquot valve when the decrease in air pressure inside the tank equals the calculated decrease in air pressure.

14. The method of claim 13, further comprising:
connecting a pipette to a pipette controller, the pipette pneumatically connecting to the pressure tank.

15. The method of claim 13, further comprising:
determining air pressure inside the pipette.

16. The method of claim 13, further comprising:

determining an angle of the pipette relative to vertical using an orientation sensor; and correcting the amount of airflow from the pressure tank to the pipette to dispense the volume of fluid equal to the aliquot volume based on the angle of the pipette.

17. The method of claim 13, further comprising:

restricting the air flow from the pressure tank to the pipette.

18. A pipette controller comprising:

a pipette holder adapted to operatively connect a pipette to the pipette controller;

a pressure tank pneumatically connected to the pipette holder;

a pressure tank pressure sensor that measures the air pressure inside the pressure tank;

a pump pneumatically connected to the pressure tank and configured to inject air into the pressure tank to maintain a positive air pressure inside the pressure tank;

a vacuum tank pneumatically connected to the pipette holder;

a vacuum tank pressure sensor that measure the air pressure inside the vacuum tank;

a pump pneumatically connected to the vacuum tank and configured to evacuate air from the vacuum tank to maintain a negative pressure inside the vacuum tank;

an aspiration valve that controls airflow from the pipette holder to the vacuum tank;

a dispense valve that controls airflow from the pressure tank to the pipette holder;

a pressure sensor that measures pressure in the pipette holder, such pressure being substantially the same as the pressure in the pipette;

an electronic controller that interfaces with the pressure sensors and can control at least the aspirate valve, dispense valve, and pump; and a user interface in communication with the electronic controller to communicate a volume to be aspirated or dispensed;

wherein the electronic controller opens the dispense valve and subsequently closes it when the air pressure measured by the pressure tank pressure sensor changes to a pre-determined air pressure change corresponding to the amount of air transferred from the pressure tank to the pipette holder to dispense a volume of fluid equal to the desired dispense volume.

19. The pipette controller of claim 18, wherein the electronic control opens the aspirate valve and subsequently closes it when the air pressure measured by the vacuum tank pressure sensor changes corresponding to the amount of air transferred from the pipette holder to the vacuum tank to aspirate a volume of fluid equal to the desired aspiration volume.

20. The pipette controller of claim 18, further comprising:

a flow restrictor.

21. The pipette controller of claim 20, further comprising:

a flow restrictor control;

wherein the flow restrictor modifies the air flow between the pipette holder and the vacuum or pressure tank, and wherein the flow restrictor control varies such restriction.

22. The pipette controller of claim 18, further comprising:

an orientation sensor that measures an angle of a pipette connected to the pipette holder relative to vertical, wherein the pipette controller corrects the amount of air exchanged between the pressure or vacuum tank and the pipette holder to dispense or aspirate the volume of fluid equal to the desired volume based on the angle of the pipette.

23. The pipette controller of claim 18 further comprising:

an electronic control that can alternately open and close the aspirate and dispense valves to alternately pneumatically connect the pipette holder to positive and negative pressure to effect alternate aspiration and dispensing of fluid from the pipette.

24. The pipette controller of claim 18, further comprising:

an electronic controller which can aspirate a quantity of fluid into a pipette and then dispense precise measured sequential aliquots of the fluid.

* * * * *